United States Patent [19]

Kruesi

[11] Patent Number: 5,173,276
[45] Date of Patent: Dec. 22, 1992

[54] METHOD FOR RECOVERY OF COPPER FROM COPPER-CONTAINING MATERIALS

[75] Inventor: William H. Kruesi, Golden, Colo.

[73] Assignee: Cato Research Corporation, Wheat Ridge, Colo.

[21] Appl. No.: 530,824

[22] Filed: May 30, 1990

[51] Int. Cl.⁵ .................. C01G 1/10; C22B 15/10
[52] U.S. Cl. ................................ 423/23; 75/717
[58] Field of Search ..................... 423/23; 75/717

[56] References Cited

U.S. PATENT DOCUMENTS 3,197,274  7/1965  White ........................... 423/23

Primary Examiner—Peter D. Rosenberg
Attorney, Agent, or Firm—Sheridan Ross & McIntosh

[57] ABSTRACT

A process for precipitating solid hydrates of cupric tetrammine sulfate from a solution, wherein the solution contains at least 40 grams per liter of free ammonia, at least 50 grams per liter of ammonium sulfate and wherein the temperature of the solution is less than 21° C. The hydrates of cupric tetrammine sulfate can be converted to additional useful copper compounds.

25 Claims, 3 Drawing Sheets

METHOD FOR RECOVERY OF COPPER FROM COPPER-CONTAINING MATERIALS

RELATED APPLICATION

This application is related to U.S. patent application Ser. No. 07/530,834 filed on May 30, 1990, entitled "Process for the Removal of Zinc and Nickel from Copper Ammine Sulfate Solutions" the specification of which is incorporated by reference herein in its entirety.

FIELD OF THE INVENTION

The present invention relates generally to the extraction of copper from copper-containing materials such as low grade ores, oxidic dusts, drosses and scrap contaminated with nickel and zinc, and the direct production of high purity copper compounds from the aqueous solution, and in particular, the direct production of solid hydrates of copper ammine sulfate from cupric tetrammine sulfate solution.

BACKGROUND OF THE INVENTION

The recycling of copper from copper-containing scrap accounts for a significant part of the United States copper supply. While scrap with a copper concentration greater than 50% may be economically smelted, lower grades of copper scrap, particularly those with a copper concentration of less than 30% by weight, are infrequently recycled because existing methods are not economical. Low grade copper scrap is generated at a rate of 200,000–300,000 tons per year. An example of low grade scrap is the "breakage" portion of shredded automobile scrap produced by the sorting of copper-containing motors. The "breakage" typically contains 10–20% copper by weight.

Recycled copper can be used in the production of valuable copper compounds. Copper compounds such as tribasic copper sulfate ($3Cu(OH)_2 \cdot CuSO_4$) and copper sulfate ($CuSO_4$) have wide application. Copper sulfate is a fungicide and algicide, and is used as a source of copper in animal nutrition, as a fertilizer, and as a source for other copper compounds. Tribasic copper sulfate is a fungicide and is a source for other copper compounds.

In view of the large quantity of low grade copper scrap and the commercial value of copper compounds, an economical method for the production of copper compounds from low grade copper materials is needed. Moreover, it would be beneficial to have a method which provides copper compounds in a concentrated form with minimal contamination by other metals.

To be economical, the method should exclude expensive, intermediary steps. It would be beneficial if the copper could be recovered from a copper-bearing leachate in the form of a material that is readily converted into other commercially valuable copper compounds, without the necessity of an expensive intermediary copper purification step.

To produce copper compounds in a concentrated form with minimal contamination, the method of recovery of copper from the copper-containing leachate should be specific for copper and exclude contaminating metals, such as zinc and nickel.

U.S. Pat. No. 3,971,652 (1976) by Bryson discloses the use of an ammoniated ammonium carbonate solution containing sulfate ions to extract copper from dross recovered from lead smelting. The copper was separated from the leachate by contacting the leachate with an organic solvent containing an hydroxy-oxime (see, for example, U.S. Pat. No. 3,244,873 to Swanson (1965)) which is a specific extractant for copper. Copper in the organic phase was then back extracted into a strong aqueous mineral acid solution such as sulfuric acid. The copper could then be purified from acidic copper sulfate solution by electrolysis or reduction with a reducing agent. Alternately, copper sulfate could be produced from the acidic copper sulfate solution by evaporation of the solution. The Swanson method has the drawback of the use of expensive organic solvents.

Copper ammine sulfate has long been regarded as a desirable lixiviant for the dissolution of copper from copper-containing sources. In "Extractive Metallurgy of Copper", Arbiter & Milligan eds., Vol. 2, pp. 974–993 (1976), a method is described for the treatment of a copper tetrammine sulfate leachate with sulfur dioxide for the precipitation of intermediate sulfites, preferably cuprous ammonium sulfite, $Cu_2SO_3(NH_4)_2SO_3$. The precipitate is washed, and thermally treated to decompose to copper metal of high purity. This method, however, does not provide for the production of copper compounds directly from copper ammine sulfate leachate.

Accordingly, there is a need for a process which provides for the economical recovery of copper from copper-containing scrap, especially scrap having less than about 30% copper, whereby copper is recovered in a form that is readily converted into other commercially valuable copper compounds, without the necessity of an expensive intermediary step of copper purification. The method should provide for the recovery of copper with a minimal amount of contaminating metals, such as zinc and nickel.

It has now been found that a mixture of copper-bearing compositions, and in particular, the mono- and trihydrates of cupric tetrammine sulfate (HCTS) having the formulas $Cu(NH_3)_4SO_4 \cdot H_2O$ and $Cu(NH_3)_4SO_4 \cdot 3H_2O$, respectively, can be selectively precipitated from a copper ammine sulfate solution. The hydrates of copper tetrammine sulfate are known compounds which were known to be formed by the dehydration of cupric tetrammine solution (see, e.g., Mellor, A Comprehensive Treatise on Inorganic and Theoretical Chemistry, pp. 251–260 (1960)). The selectivity in precipitation made possible by the practice of the present invention allows for the isolation of copper in the precipitate, leaving nickel and zinc ammine sulfates in solution. The precipitated HCTS, typically having less than a total of 0.02% by weight of nickel and zinc contamination, can be readily converted into high purity copper compounds.

SUMMARY OF THE INVENTION

In accordance with the present invention, a process is provided for efficiently precipitating hydrates of cupric tetrammine sulfate from a cupric tetrammine sulfate solution. The cupric tetrammine sulfate solution contains at least 50 grams per liter of ammonium sulfate and at least 40 grams per liter of free ammonia. The free ammonia is that ammonia in solution which is not complexed as ammines in copper, zinc, nickel, or certain other ammine-forming metals. In order to effectively precipitate the HCTS, the temperature of the solution is adjusted to 21° C. or less, and the concentration of free ammonia is adjusted to at least 80 grams per liter.

In accordance with another embodiment of the present invention, a process is provided for recovering copper which involves the preparation of HCTS. The process involves providing an aqueous solution of cuprous ammine sulfate, ammonium sulfate and free ammonia, with the solution having a pH of at least about 8.5. The cuprous ammine sulfate is oxidized to cupric tetrammine sulfate. Sufficient ammonia is added to raise the free ammonia concentration to at least about 80 grams per liter to precipitate the HCTS. HCTS are precipitated at a solution temperature of less than about 21° C.

In another embodiment, the instant invention involves a process for recovering copper from copper-containing materials contaminated with nickel and zinc. The process involves contacting the copper-containing materials with a sufficient amount of cupric tetrammine sulfate, ammonium sulfate and ammonia to produce a cuprous ammine sulfate solution. The cuprous ammine sulfate is oxidized to produce cupric tetrammine sulfate. Sufficient free ammonia is added to precipitate HCTS. HCTS are precipitated at a solution temperature below 21° C., preferably in the range of about 0° C. to about 4° C. The HCTS precipitate is washed to remove nickel and zinc contaminants. In a further embodiment, the HCTS can be treated to produce copper compounds such as tribasic copper sulfate, cupric tetrammine sulfate solution or anhydrous copper sulfate.

In an alternative embodiment of the present invention, copper can be leached from copper-containing materials with an acidic solution. The leached copper can then be converted to a cupric tetrammine sulfate solution by adding ammonia or ammonium hydroxide. HCTS can then be precipitated from the cupric tetrammine sulfate solution as discussed above.

DETAILED DESCRIPTION OF THE INVENTION

Figure 1:
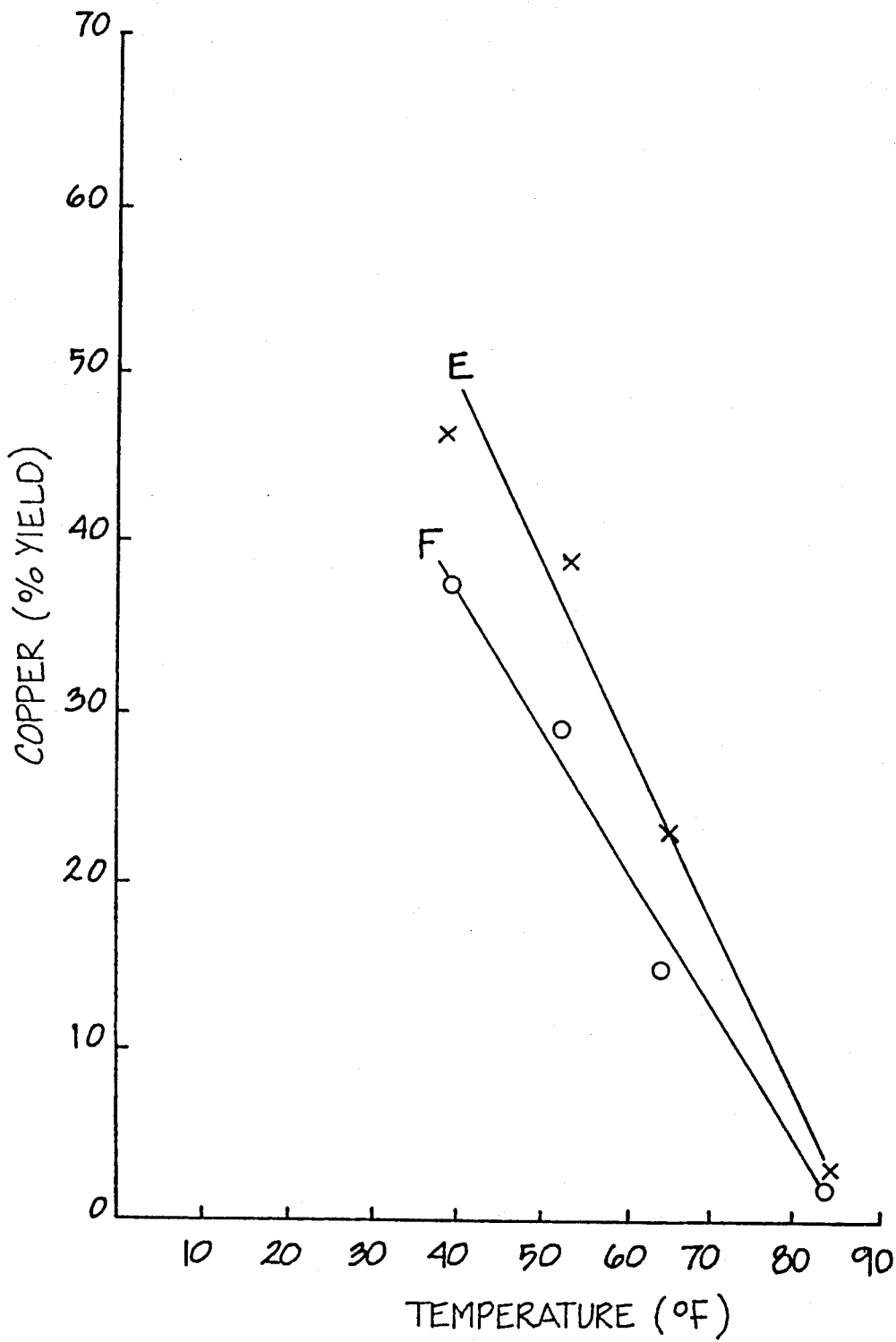
FIG. 1 is a graph showing experimental results which indicate that HCTS yield increases with an increase in free ammonia concentration and with a decrease in temperature.

The instant invention involves the preparation of HCTS precipitates and the use of HTCS precipitates to form copper compounds. The present invention also involves a process for the formation of copper compounds from copper-containing materials such as scrap, drosses, oxidic dust, ores and concentrates contaminated with nickel and zinc.

In one embodiment of the instant process, the copper-containing materials are leached with an aqueous solution of cupric tetrammine sulfate having a pH greater than about 8.5 to produce cuprous ammine sulfate, which in turn is oxidized to cupric tetrammine sulfate. The cupric tetrammine sulfate solution is cooled and ammonia is added to provide free ammonia in solution. The cooling step and the addition of ammonia can be carried out simultaneously or in either order. The cooling and the excess free ammonia results in the precipitation of HCTS. It has been found that the precipitation of HCTS is accelerated by high free ammonia concentration (preferably greater than 80 g/l) and by low temperatures of the cupric tetrammine sulfate solution (preferably 0° C. to 4° C). It has been found that a variety of copper compounds, including $CuSO_4$ and $3Cu(OH)_2 \cdot CuSO_4$, can be produced directly from HCTS, i.e., without the extra step of producing pure metallic copper.

As will be appreciated by one skilled in the art, the original cupric tetrammine sulfate solution can be obtained in a number of ways. For example, copper-containing material can be leached with an acidic solution. The copper-containing leachate can be converted to a cupric tetrammine sulfate solution by raising the pH, for example by the addition of ammonia or ammonium hydroxide.

While not wishing to be bound by any theory, it is believed that the combination of: 1) an excess of free ammonia (preferably greater than 80 g/l), 2) sufficiently high ammonium sulfate concentration (preferably greater than 50 g/l); and 3) low temperature (preferably less than 21° C.) results in the effective precipitation of HCTS, as provided by the present invention.

HCTS form purple crystals having a needle shape. X-ray crystallography indicates that the HCTS solid primarily comprises the monohydrate. However, without wishing to be bound by theory, it is believed that the trihydrate can also be present. The HCTS solid is stable in an ammonia atmosphere, for example, in a sealed vessel containing ammonia gas. It is also stable in an atmosphere of cool, dry air. In moist or warm air, ammonia is slowly lost from HCTS resulting in the formation of tribasic copper sulfate. This conversion is accompanied by a color change: as ammonia is lost, the purple crystal changes to blue, which indicates a mixture of HCTS and tribasic copper sulfate; further loss of ammonia results in the formation of green tribasic copper sulfate.

When the HCTS solid is contacted with water, it is solubilized until the copper concentration in the solution reaches about 90 g/l. Such a mixture of HCTS in equilibrium with cupric tetrammine sulfate provides a convenient, pure and concentrated source of cupric tetrammine sulfate which can be used for the direct production of other copper compounds without the additional step of purifying metallic copper.

Copper compounds can also be directly produced from HCTS by heating. When heated to 300° C. in air, ammonia and water are volatilized and anhydrous copper sulfate is produced. Alternately, when the HCTS solid is heated to a temperature in the range of about 38° C. to about 93° C. and washed with water to remove ammonium sulfate, tribasic copper sulfate is produced.

In a preferred embodiment of the process of the instant invention, cupric tetrammine sulfate $(Cu(NH_3)_4SO_4)$ solution is contacted with the scrap or other copper-containing material to solubilize the metallic copper therein. The cupric ion of cupric tetrammine sulfate oxidizes the copper present in the copper-containing material to form a copper ammine solution containing copper in the cuprous and cupric state.

Cupric ammine sulfate has long been recognized as a desirable lixiviant for the dissolution of copper from copper-containing materials such as scrap, ores, dusts and drosses because very few metals form soluble ammines. However, cupric tetrammine sulfate can oxidize nickel and zinc in the copper-containing material to produce soluble nickel ammine sulfate and zinc ammine sulfate complexes. In the instant process, these contaminants can be readily separated from the copper in a later step.

Contacting the copper-containing material with the cupric tetrammine sulfate solution can be accomplished in a digesting or leaching zone. Agitation or mixing can be provided to maximize leaching efficiency. The mixing can be accomplished in the leaching zone in any manner suitable for mixing said materials, for example, by recycling the leachate through the leaching zone, rotating the leaching zone vessel, or stirring the leaching zone with a mechanical mixer such as an impeller.

Following the addition of the cupric tetrammine sulfate to the copper-containing materials in the leaching zone or digestor, the copper concentration of the solution should preferably be maintained near saturation, or in the range of about 90 to 100 grams per liter (g/l), because as the copper concentration decreases from saturation, the yield of HCTS decreases. The solution should contain ammonium sulfate ($(NH_4)_2SO_4$) in an amount of at least about 50 g/l and preferably in the range of about 200 to 300 g/l. If less than 50 g/l ammonium sulfate is present in the solution and free ammonia concentration is greater than 60 g/l, copper hydroxides can precipitate. This is undesirable, because the copper hydrates can be in a non-crystalline, gelatinous form, which is hard to purify. Ammonium sulfate can be added to the leaching zone as necessary or desired to maintain the desired concentration.

The solution should also contain "free" ammonia, i.e., ammonia not complexed to copper, zinc, nickel or other ammine forming metals, in a concentration of at least 40 g/l. The pH of the solution should be at least 8.5 and preferably is in the range of about 9 to about 11. Ammonia can be added to adjust the pH and free ammonia concentration by bubbling ammonia gas through the solution or by adding a solution of aqueous ammonia. Acceptable aqueous ammonia concentrations are from about 100 to about 270 grams ammonia per liter of water. Addition of aqueous ammonia is preferred because the heat liberated during dissolution of ammonia in water must be counteracted by additional cooling of the solution. The yield of HCTS has been found to increase with increased free ammonia concentration and decrease with increased temperature.

The effect of ammonia concentration and temperature are shown in FIG. 1. It has been found that free ammonia must be present in order to form HCTS.

Following solubilization of the copper from the copper-containing material in the leaching zone, the substantially decoppered residue is removed from the resulting cuprous ammine sulfate solution by any suitable separation means, such as filtration or centrifugation.

The cuprous ammine sulfate solution is then contacted with an oxidizing agent to convert the copper to the cupric state. Any oxidizing agent capable of oxidizing cuprous ion to cupric ion can be used, for example, with air, enriched air or substantially pure oxygen. Oxidation using an oxygen-containing gas can be accomplished by passing the gaseous oxygen into the solution, e.g., by bubbling or sparging, or by agitation or vigorous stirring of the solution. The amount of oxygen necessary to convert one mole of cuprous ammine sulfate to cupric ammine sulfate is one-quarter mole of $O_2$.

Prior to the addition of ammonia to the cupric tetrammine sulfate solution, the solution can be treated to reduce nickel and zinc content. Preferably the process of related U.S. patent application Ser. No. 07/530,834, filed on May 30, 1990, entitled "Process for the Removal of Zinc and Nickel from Copper Ammine Sulfate Solutions" and incorporated herein in its entirety by reference, is employed. The process of said Ser. No. 07/530,834 can reduce the total nickel and zinc concentration in a cupric tetrammine sulfate solution to less than 2 g/l by the precipitation and removal of zinc and nickel ammonium sulfate salts. According to the method of said Ser. No. 07/530,834, the pH of a cupric tetrammine sulfate solution contaminated with nickel and zinc is adjusted from a pH in excess of about 8.5 to a pH between about 7.5 and about 8.0 to form a precipitate comprising nickel and zinc ammonium sulfate salts. Following separation of the precipitate from the cupric tetrammine sulfate solution, the recovered precipitate can undergo nickel and zinc recovery processes, while the cupric tetrammine sulfate solution can be used either for production of cathode copper or the generation of HCTS according to the method of the present invention.

The cupric tetrammine sulfate solution is cooled to less than about 21° C., preferably to between about 0° C. and about 4° C. It has been found that the yield of HCTS increases with decreasing temperature. Although temperatures of about 0° C. to about 4° C. are preferred, production of the HCTS is still possible at lower yields at temperatures as high as 21° C. Formation of HCTS at 21° C. requires large amounts of free ammonia. It has also been found that at temperatures between about 0° C. and about 4° C., the yield of HCTS increases with increasing free ammonia concentration.

Sufficient ammonia should be added to the cupric tetrammine sulfate solution to raise the free ammonia concentration to at least about 80 g/l and preferably to at least about 100 g/l. If the free ammonia concentration is already above 80 g/l, no ammonia need be added. As indicated above, the yield of HCTS has been observed to increase with increasing free ammonia concentration. Ammonia can be provided by adding aqueous $NH_3$ or by passing $NH_3$ gas into the solution. As indicated hereinabove, the latter method has the disadvantage that the heat liberated during the dissolution of the ammonia must be counteracted by additional cooling of the solution.

The steps of cooling the cupric ammine sulfate solution and the addition of ammonia to increase the free ammonia concentration to at least about 80 g/l can be performed simultaneously or in any order.

The formation of solid HCTS is usually complete within about 10 minutes. It is significant that only the cupric tetrammine sulfate undergoes crystallization to form HCTS; neither zinc nor nickel ammine sulfates form a precipitate in the pH range of about 8.5 to about 11. This selectivity in crystallization of only the mono- and trihydrates of cupric tetrammine sulfate allows for substantial separation of copper from zinc and nickel in a cupric tetrammine sulfate solution containing zinc and nickel ammine sulfates. Normally, the HCTS precipitate contains less than about 1% by weight zinc and substantially no nickel. This clean separation of copper in the form of HCTS from nickel and zinc ammine sulfates allows for the production of high purity copper compounds from HCTS due to the small amount of nickel and zinc contaminants associated with the HCTS.

The solid HCTS is separated from the solution by any means suitable for separating a solid from a liquid, such as filtration or centrifugation. Remaining cupric tetrammine sulfate solution can be recycled to the leaching zone to solubilize more copper in the copper-containing material. The HCTS solid can be washed to remove adhering nickel and zinc contaminants. However, washing is optional; whether it is desirable depends on the original level of contamination in the cuprous ammine sulfate solution and on whether contaminating materials were removed from the cupric tetrammine sulfate solution prior to the precipitation of HCTS. Because nickel ammine sulfate is relatively stable, very little nickel contaminants co-precipitate with HCTS. However, approximately one weight percent zinc contaminants can precipitate in the HCTS and therefore washing may be desirable.

If the solid HCTS is washed, the preferred solvent is an aqueous solution of ammonia containing at least about 100 g/l ammonia at about 0° to about 4° C. Alternately, contaminants can be removed by washing the solid HCTS with a nonaqueous solvent such as ethylene glycol or mixtures of ethylene glycol and ethyl or methyl alcohols.

To produce $CuSO_4$ directly from HCTS, the latter is heated to about 300° C. in air to produce anhydrous copper sulfate, ammonia and water. The volatilized ammonia can be recycled in the instant process and used to produce HCTS from the cupric tetrammine sulfate solution.

To produce tribasic copper sulfate directly from HCTS, the HCTS solid is heated to a temperature in the range of about 38° to about 93° C. Ammonia is volatilized from the HCTS and the residue is washed with water to remove $(NH_4)_2SO_4$ The volatilized ammonia can be recycled to produce HCTS from the cupric tetrammine sulfate solution.

Alternately, copper compounds can be produced by way of the cupric tetrammine sulfate solution. This requires mixing HCTS with water to produce cupric tetrammine sulfate solution having a concentration as high as 90–100 g/l. To produce tribasic copper sulfate from the cupric tetrammine solution, $H_2SO_4$ is added to adjust the pH to a range from about pH 5.6 to about pH 7.0. Within this pH range, tribasic copper sulfate precipitates, and the precipitate can be separated by any means suitable for separating a solid from a liquid, such as centrifugation or filtration.

Figure 2:
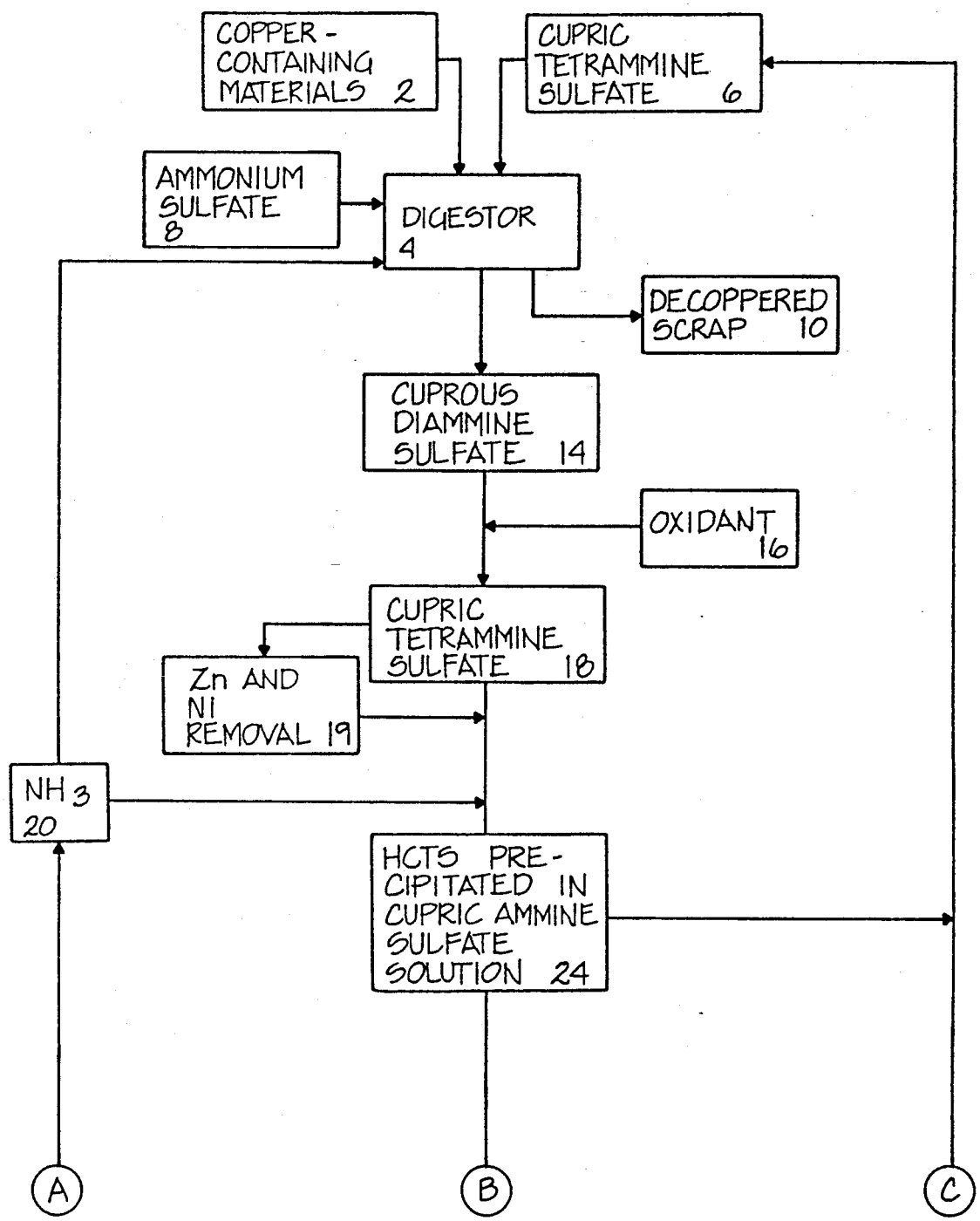
FIGS. 2 and 2a are a flow diagram of a preferred embodiment of the process of the present invention.
Figure 2A:
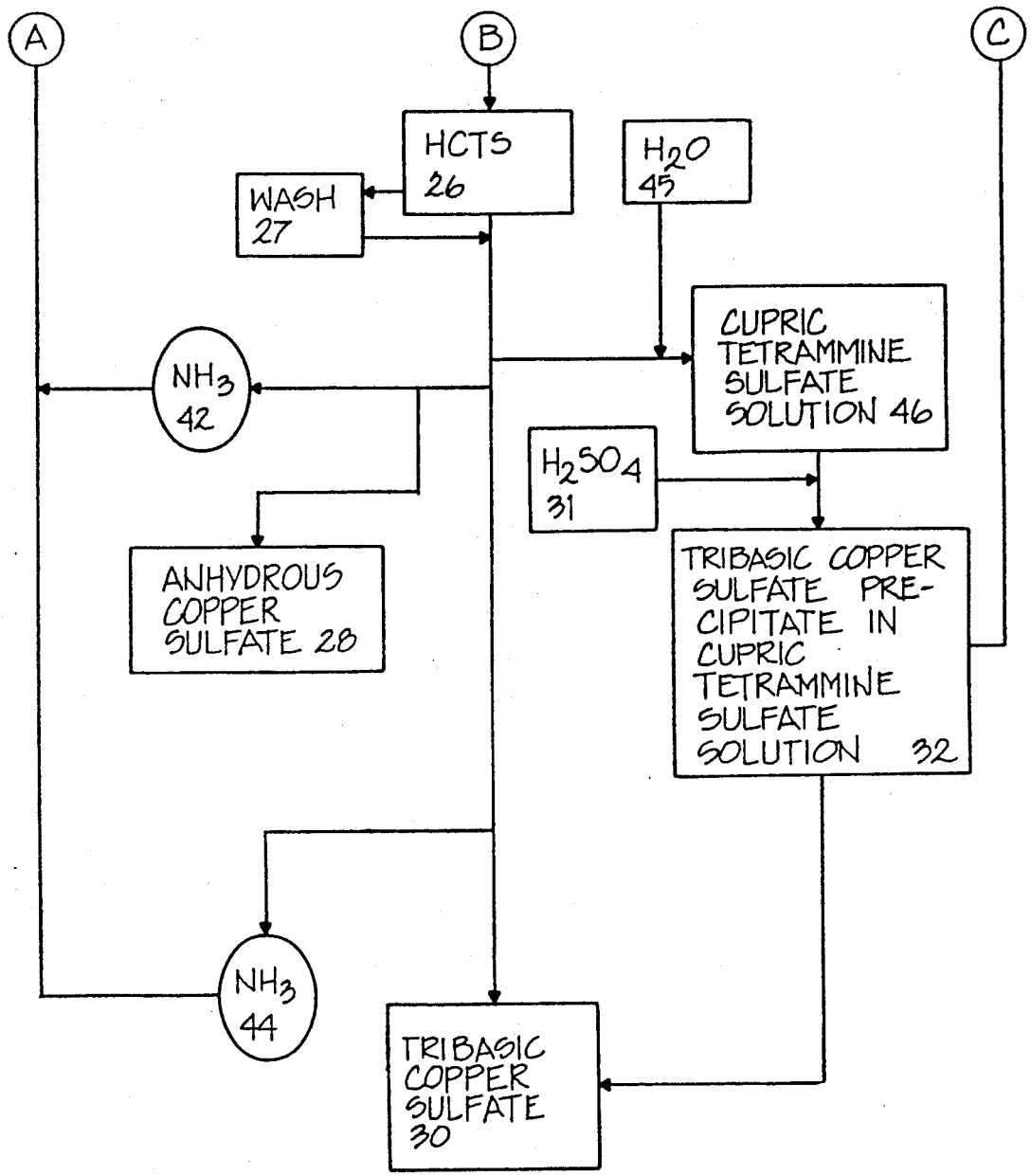

The invention can be readily understood from a brief description of a preferred embodiment of the instant process as represented in the flow diagram of FIG. 2 and 2a. Low grade copper-containing material 2, such as breakage, and cupric tetrammine sulfate solution 6 are added to a digestor 4. The leaching process can be carried out in the digestor 4, which can be a vessel or vat with a means for agitation or mixing. The cupric tetrammine sulfate solution 6 selectively solubilizes only a few metals, including copper, zinc and nickel. It has been observed that the cupric tetrammine sulfate solution 6 does not attack steel provided that the free ammonia in solution is sufficient to produce a pH above 9.5. The digestor 4 can therefore be made of steel.

After addition of cupric tetrammine sulfate solution 6 and copper-containing material 2 to the digestor 4, ammonium sulfate 8 can be added if necessary to bring the ammonium sulfate concentration to at least about 50 g/l, and preferably to the range of about 200 to 300 g/l. Ammonia 20 can be added to raise the free ammonia concentration to at least 40 g/l and to raise the pH to at least about pH 8.5, and preferably to raise the pH to within the range from about pH 9 to about pH 11. Sufficient copper-containing material 2 is added to raise the copper concentration to saturation. The cupric ion of cupric tetrammine sulfate lixiviant 6 oxidizes metallic copper in the copper-containing material 2 to produce a cuprous diammine sulfate complex in solution 14.

Following removal of the substantially decoppered scrap 10, the cuprous ammine sulfate 14 is oxidized by adding oxidant 16 to produce cupric tetrammine sulfate in solution 18. The oxidant 16 is preferably air sparged into the cuprous ammine sulfate solution 14 to produce a cupric tetrammine sulfate solution 18. The cupric tetrammine sulfate solution 18 is cooled to below 21° C., and preferably in the range of about 0° C. to about 4° C. Optionally, the zinc and nickel concentrations in the cupric tetrammine sulfate solution can be reduced 19, preferably by the method of Ser. No. 07/530,834.

Ammonia 20 is added, preferably as aqueous ammonia 20, unless the free ammonia concentration is already above 80 g/l. The addition of ammonia 20 results in the precipitation of HCTS in the cupric tetrammine sulfate solution 24. The solid HCTS 26 can be separated by any means suitable for separating a solid from a liquid, such as centrifugation or filtration. The filtrate, cupric tetrammine sulfate solution 6, can be recycled to the digestor 4.

Recovered HCTS 26 can optionally be washed 27 to remove any adhering nickel and zinc. The HCTS can then be employed to generate additional useful compounds, such as anhydrous copper sulfate 28 and tribasic copper sulfate 30. Heating HCTS at about 300° C. in air produces anhydrous copper sulfate 28 and releases $NH_3$ gas 42, which can be recycled either to the digestor 4 or to form the precipitate HCTS 24 from cupric tetrammine sulfate 18. Heating HCTS at 38° C. to 93° C. produces tribasic copper sulfate 30 and liberates ammonia gas 44 which can be recycled. Dissolution of HCTS 26 in water 45 produces a cupric tetrammine sulfate solution 46. The addition of sufficient $H_2SO_4$ 31 to adjust the pH of the solution to 5.6 to 7.0, results in the precipitation of tribasic copper sulfate 32. The tribasic copper sulfate precipitate 30 is separated by filtration or centrifugation. The remaining filtrate, cupric tetrammine sulfate 6 can be recycled to the digestor 4.

The following examples are intended by way of explanation and not by way of limitation.

EXAMPLE 1

An aqueous solution of 90 g/l cuprous ammine sulfate having a pH of pH 9.0, a free ammonia concentration of 40 g/l, and an ammonium sulfate concentration of 150 g/l, was contacted with oxygen by sparging air through the solution. The solution was divided into samples A and B. Sample A was cooled to 1° C. and 30% by weight aqueous ammonia was added to raise the free ammonia concentration to 80 g/l. More than 40% by weight of the copper present initially in sample A precipitated as HCTS.

In contrast, sample B was cooled to 10° C. under otherwise identical conditions. Only 28% by weight of the copper precipitated as HCTS. This example illustrates that the yield of copper in the form of HCTS improves with cooler temperatures.

EXAMPLE 2

An aqueous solution containing 90 g/l cuprous ammine sulfate, having pH of pH 9.0, a free ammonia concentration of 40 g/l, and an ammonium sulfate concentration of 150 g/l, was contacted with oxygen by bubbling air through the solution. The solution was cooled to 4° C. and divided into samples C and D. To sample C was added sufficient ammonia to raise the free ammonia concentration to 90 g/l. The resulting HCTS precipitate contained 35% by weight of the original copper present.

In contrast, the free ammonia concentration in sample D was raised to 130 g/l. The resulting HCTS precipitate contained 46% by weight of the original copper present. This experiment illustrates that increased free ammonia concentration results in increased yields of HCTS and copper.

EXAMPLE 3

A solution of 90 g/l cuprous ammine sulfate having pH of 9.0, a free ammonia concentration of 40 g/l, and an ammonium sulfate concentration of 150 g/l, was contacted with oxygen by sparging air through the solution. The solution was cooled to a temperature of 21° C. Free ammonia concentration was increased to 100 g/l by the addition of 30% by weight aqueous ammonia. The resulting HCTS precipitate contained only 15% of the original copper present in the cupric tetrammine sulfate solution, due to the relatively high temperature.

EXAMPLE 4

Copper scrap was leached in a digestor with an aqueous cupric tetrammine sulfate solution to produce a leachate containing 90 g/l copper, 200 g/l ammonium sulphate and 40 g/l free ammonia. The leachate was cooled to 2° C. The cooled leachate was divided into Samples E and F. 300 ml of aqueous ammonia containing 270 g/l ammonia was added to Sample E, while 150 ml of aqueous ammonia containing 270 g/l ammonia was added to Sample F, resulting in an increase in temperature. Formation of the solid HCTS was complete within ten minutes. The precipitate was removed by filtration and washed with 50% by volume ammonia solution having a temperature of 4° C.

In FIG. 1, Sample E is represented by the line on the right while sample F is represented by the line on the left. The higher ammonia concentration is shown to increase the yield of HCTS.

FIG. 1 also demonstrates that as the temperature was lowered from 29° C. to 3° C. for sample E and sample F, the yield of HCTS increased. The individual lines represent the individual samples, with the plotted points representing the weight of the precipitate at successively cooler temperatures.

EXAMPLE 5

Several grams of HCTS were removed from a storage vessel in which an ammonia atmosphere was maintained and placed in a dish in an air atmosphere at ambient temperature. Gradually, the purple crystal, HCTS, changed to blue, indicating a mixture of HCTS and tribasic copper sulfate. The blue color then gradually changed to green indicating the formation of green tribasic copper sulfate. This examples illustrates the ease by which HCTS can be converted to other useful compounds.

While embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process for the precipitation of hydrates of cupric tetrammine sulfate from a cupric tetrammine sulfate solution, wherein said process comprises the steps of:
   (a) providing a cupric tetrammine sulfate solution;
   (b) providing a concentration of ammonium sulfate in said cupric tetrammine sulfate solution of at least 50 g/l;
   (c) providing a free ammonia concentration in said cupric tetrammine sulfate solution of at least 80 g/l; and
   (d) adjusting the temperature of said cupric tetrammine sulfate solution to less than about 21° C. and precipitating hydrates of cupric tetrammine sulfate.

2. The process of claim 1, wherein the concentration of said free ammonia is at least 100 g/l.

3. The process of claim 1, wherein the pH of said cupric tetrammine sulfate solution is at least pH 8.5.

4. The process of claim 1, wherein the concentration of ammonium sulfate is at least 150 g/l.

5. The process of claim 1, wherein the concentration of ammonium sulfate is from about 200 g/l to about 300 g/l.

6. The process of claim 1, wherein the pH is from about pH 9 to about pH 11.

7. The process of claim 1, wherein said the temperature of said cupric tetrammine sulfate solution is from about 0° C. to about 4° C.

8. The process of claim 1, further comprising the steps of:
   separating said precipitated hydrates of cupric tetrammine sulfate from said cooled cupric tetrammine sulfate solution, and
   substantially removing any nickel or zinc contaminants from said separated precipitate by washing said separated precipitate with an aqueous solution of ammonia.

9. The process of claim 1, wherein said cupric tetrammine sulfate solution is obtained by leaching copper from copper-containing materials.

10. The process of claim 1, wherein said cupric tetrammine sulfate solution is obtained by leaching copper from copper-containing materials using a cupric tetrammine sulfate lixiviant, thereby forming a cuprous ammine sulfate leachate and oxidizing said cuprous ammine sulfate leachate to form a cupric tetrammine sulfate solution.

11. The process of claim 1, wherein said cupric tetrammine sulfate solution is obtained by dissolving copper from copper-containing materials with an acidic solution and raising the pH of said solution by adding a compound selected from the group consisting of ammonia and ammonium hydroxide.

12. A process for the preparation of hydrates of cupric tetrammine sulfate, comprising the steps of:
   (a) providing an aqueous solution of cupric tetrammine sulfate containing at least 50 g/l (NH$_4$)$_2$SO$_4$ and at least 40 g/l free ammonia and having a pH of at least pH 8.5; and
   (b) cooling said cupric tetrammine sulfate solution to a temperature less than about 21° C. and adding sufficient ammonia to said solution to raise the free ammonia concentration to at least 80 g/l in order to precipitate said hydrates of cupric tetrammine sulfate.

13. The process of claim 12, wherein said providing step comprises providing an aqueous solution of cupric tetrammine sulfate containing between about 200 g/l and 300 g/l (NH$_4$)$_2$SO$_4$.

14. The process of claim 12, wherein said providing step comprises providing an aqueous solution of cupric tetrammine sulfate having a pH of between about pH 9 and about pH 11.

15. The process of claim 12, wherein said step of cooling said cupric tetrammine sulfate solution comprises cooling said cupric tetrammine sulfate solution to between about 0° C. and about 4° C.

16. The process of claim 12, wherein sufficient ammonia is added to said cupric tetrammine sulfate solution to provide a free ammonia concentration of at least 100 g/l.

17. The process of claim 12, wherein said step of adding ammonia to said cupric tetrammine sulfate solution comprises adding an aqueous solution of ammonia.

18. The process of claim 12, further comprising:
separating said precipitated hydrates of cupric tetrammine sulfate from said solution; and
substantially removing contaminants from said separated precipitate by washing said separated precipitate with an aqueous solution of ammonia having an ammonia concentration of at least about 100 g/l and a temperature of between about 0° C. and 4° C. to provide a washed composition.

19. The process of claim 12, further comprising heating said precipitate to about 300° C. to produce $CuSO_4$ and $NH_4OH$.

20. The process of claim 12, further comprising the steps of:
heating said precipitate to between about 38° C. and about 93° C.;
washing said heated composition with water to produce tribasic copper sulfate and aqueous ammonium sulfate.

21. The process of claim 12, further comprising the steps of:
mixing said washed composition with water to produce a second solution of cupric tetrammine sulfate;
lowering the pH of said second solution to the range of about pH 5.6 to about pH 7.0 to form solid tribasic copper sulfate; and
separating said solid tribasic copper sulfate from said acidified second solution of cupric tetrammine sulfate.

22. A process for the purification of copper, useful in the separation of copper from copper-containing materials contaminated with nickel and zinc, wherein said process comprises the steps of:
(a) combining a sufficient amount of cupric tetrammine sulfate solution, ammonium sulfate, ammonia and said copper-containing materials to produce a cuprous ammine sulfate solution having an ammonium sulfate concentration of at least 50 g/l, a free ammonia concentration of at least 40 g/l, a pH in the range of about pH 8.5 to about pH 11, and a copper concentration of about 40 g/l to about 100 g/l;
(b) contacting said cuprous ammine sulfate leachate with an oxidant to produce a cupric tetrammine sulfate leachate;
(c) cooling said cupric tetrammine sulfate leachate to a temperature of less than 21° C. and adding sufficient ammonia to said cupric tetrammine sulfate leachate to raise the free ammonia concentration to at least 80 g/l and precipitate hydrates of cupric tetrammine sulfate; and
(d) separating said precipitated hydrates of cupric tetrammine sulfate from said cooled cupric tetrammine sulfate leachate.

23. The process of claim 22, further comprising the step of removing nickel or zinc contaminants from said separated precipitate by washing said separated precipitate with an aqueous solution of ammonia.

24. The process of claim 22, wherein said ammonium sulfate concentration is between about 200 g/l and about 300 g/l.

25. The process of claim 22, wherein said cupric tetrammine sulfate leachate is cooled to a temperature of from about 0° C. to about 4° C.

* * * * *